(12) United States Patent
Tanaka

(10) Patent No.: US 7,620,629 B2
(45) Date of Patent: Nov. 17, 2009

(54) FILE SEARCH APPARATUS, PRINTER AND FILE SEARCH METHOD

(75) Inventor: Yoshiyuki Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 500 days.

(21) Appl. No.: 11/440,739

(22) Filed: May 24, 2006

(65) Prior Publication Data

US 2006/0271588 A1  Nov. 30, 2006

(30) Foreign Application Priority Data

May 25, 2005  (JP) .............................. 2005-152404

(51) Int. Cl.
*G06F 17/30* (2006.01)
(52) U.S. Cl. ........................................................ 707/4
(58) Field of Classification Search ...................... 707/4, 707/9, 104.1; 711/115
See application file for complete search history.

(56) References Cited

U.S. PATENT DOCUMENTS

2002/0116575 A1* 8/2002 Toyomura et al. ........... 711/115
2004/0054863 A1* 3/2004 Harada et al. ................ 711/164
2005/0198068 A1* 9/2005 Mukherjee et al. ........ 707/104.1
2005/0240590 A1* 10/2005 Shimizu et al. ................. 707/9

FOREIGN PATENT DOCUMENTS

JP        10-289251       10/1998

* cited by examiner

*Primary Examiner*—Etienne P LeRoux
(74) *Attorney, Agent, or Firm*—Nutter McClennen & Fish LLP; John J. Penny, V

(57) ABSTRACT

When a process of searching for assets stored in a memory card is selected, a controller of a printer sets searching icons associated with previously set searching-keywords as current searching icons (S110), and each time a memory card is installed in a reader/writer, acquires all keywords associated with assets, which are search objects, from the installed memory card (S170), collates the set searching-keywords with the acquired keywords (S200), and displays searching-keywords among the set searching-keywords, that do not match any of the acquired keywords in a manner that differs from a normal display (S210). A user can thus recognize that a searching-keyword that has been set is not contained in the memory card 18 before the user executes an actual search.

17 Claims, 13 Drawing Sheets

(a)

US 7,620,629 B2

FILE SEARCH APPARATUS, PRINTER AND FILE SEARCH METHOD

BACKGROUND OF THE INVENTION

1. Field of the Invention

The present invention relates to a file search apparatus, printer, and a file search method.

2. Description of the Related Art

As a conventional file search apparatus, a device that searches files by using keyword icons has been proposed, for example, in Japanese Published Unexamined Patent Application No. H10-289251. The device disclosed in the published publication prepares keyword icons, which graphically represent keywords associated with data registered in a database, and sets search conditions by positioning at least one keyword icon in a search condition setting window. The setting of the search conditions is facilitated by the use of such icons.

SUMMARY OF THE INVENTION

However, the file search apparatus disclosed in Japanese Published Unexamined Patent Application No. H10-289251 does not consider cases where there are a plurality of database-storing storage media for searching a file. Thus, when there are a plurality of storage media for searching a file, a user is required to, for example, select or install successively each of the plurality of storage medium and set the search conditions before actual execution of a file search, until the user finds out whether a file intended by the user is stored in the selected or installed storage medium. Troublesome operations were thus required to find the intended storage medium.

The present invention has been made in view of such a drawback, and an object of the invention is to provide a file search apparatus, a printer, and a file search method and a program for the same, by which a user can know whether or not a storage medium is that intended by the user without carrying out troublesome operations.

In order to achieve at least part of the above and other related objects, the present invention is constructed as follows.

The present invention is directed to a file search apparatus that searches for a file based on one or more searched-keywords associated with object files, and using searching-keywords selected by a user. The file search apparatus includes: a display unit that displays an image; an installation module to which a storage medium storing object files; a setting module that sets the searching-keywords according to an instruction by the user; an acquisition module that, when the searching-keywords are set by the setting module and the storage medium is installed to the installation module, acquires the searched-keywords associated with respective object files from the storage medium; a collation module that performs collation as to whether each of the searching-keywords set by the setting module matches any of the searched-keywords acquired by the acquisition module; and a display control module that controls the display unit to display in a manner that results of the collation by the collation module is recognizable.

With this file search apparatus, when searching-keywords are set by an instruction of a user and a storage medium is installed, searched-keywords associated with search object files are acquired from the storage medium, the set searching-keywords and the acquired searched-keywords are collated, and the display device is controlled so that the collation results can be recognized. The user can thus recognize, before executing a file search, whether there are searching-keywords among those that have been set, that match the acquired searched-keywords. Namely, the user can know whether or not the storage medium is the one intended by the user him/herself without carrying out troublesome operations. Herein, the "searching-keyword" denotes for a keyword that is selected by a user for searching a file the user desires, and the "searched-keyword" denotes for a keyword that is included in each of the object files.

In the file search apparatus of the invention, the display control module may control the display unit to display the searching-keywords in a manner that the results of collation by the collation module is recognizable. In this case, the display control module may control the display unit to display a matched searching-keyword, among the searching-keywords, which match one of the searched-keywords and a non-matched searching-keyword which does not match any of the searched-keywords in different manners, so that the results of collation by the collation module is recognizable.

In the file search apparatus of the invention, the setting module may set the searching-keywords that has been set previously as current searching-keywords. Each time a storage medium is installed to the installation module after the setting module sets the searching-keywords, the acquisition module may acquire searched-keywords associated with respective object files from the newly installed storage medium, and each time the searched-keywords associated with the object files are acquired from the storage medium by the acquisition module, the collation module may perform collation as to whether each of the searching-keywords set by the setting module matches any of the searched-keywords acquired by the acquisition module.

In one embodiment of the invention, the file search apparatus may further include an information storage module that stores icons in association with the respective searched-keywords, and the display control module may read the an icon associated with a searched-keywords corresponding to each of the searching-keywords that are selected from the searched-keywords, from the information storage module, and displays the read icons as the searching-keywords. In this embodiment, the display control module may read icons associated with the searching-keywords set by the setting module and the icons associated with the searched-keywords acquired by the acquisition module from the information storage module and displays the read icons. And in this case, the display control module may control the display unit to display characters of the searched-keywords associated with the currently selected icons, along with the icons.

In the file search apparatus of the invention, the acquisition module may acquire the searched-keywords from a predetermined keyword field included in metadata of the object files. In this case, the acquisition module may acquire the searched-keywords from metadata of the object files, which are prepared for acquisition of files and included in the file management information.

The file search apparatus may further include a searching module that searches a file that is associated with a keyword set according to an instruction by the user, from the object files stored in the storage medium mentioned above.

The present invention is also directed to a printer that includes the file search apparatus of the invention and a printing unit that prints, using colorants, contents included in a file searched by the file search apparatus, onto a printing medium.

The present invention is further directed to a file search method that searches for a file, by using a file search apparatus having a display unit that displays an image and an installation module to which a storage medium storing object files, based on one or more searched-keywords associated with object files and searching-keywords selected by a user. The file search method includes the steps of: (a) setting the searching-keywords according to an instruction by the user; (b) when the searching-keywords are set by the setting module and the storage medium is installed to the installation module, acquiring the searched-keywords associated with respective object files from the storage medium; (c) performing collation as to whether each of the searching-keywords set by the step (a) matches any of the searched-keywords acquired by the step (b); and (d) controlling the display unit to display in a manner that results of the collation by the step (c) is recognizable.

In the file search method of the invention, the step (d) may control the display unit to display the searching-keywords in a manner that the results of collation by the step (c) is recognizable.

In this case, the step (d) may control the display unit to display a matched searching-keyword, among the searching-keywords, which match one of the searched-keywords and a non-matched searching-keyword which does not match any of the searched-keywords in different manners, so that the results of collation by the step (c) is recognizable.

In the file search method of the invention, the step (a) may set the searching-keywords that has been set previously as current searching-keywords. Each time a storage medium is installed to the installation module after the step (a) sets the searching-keywords, the step (b) may acquire searched-keywords associated with respective object files from the newly installed storage medium, and each time the searched-keywords associated with the object files are acquired from the storage medium by the step (b), the step (c) may perform collation as to whether each of the searching-keywords set by the step (a) matches any of the searched-keywords acquired by the step (b).

In one embodiment of the file search method of the invention, the file search apparatus may have an information storage module that stores icons in association with the respective searched-keywords. The step (d) reads the icons associated with the searched-keywords that correspond to the searching-keywords, from the information storage module, and displays the read icons as the searching-keywords.

In this embodiment, the step (d) may reads icons associated with the searching-keywords set by the step (a) and the icons associated with the searched-keywords acquired by the step (b) from the information storage module and displays the read icons. In this case, the step (d) may control the display unit to display characters of the searched-keywords associated with the currently selected icons, along with the icons.

In the file search method of the invention, the step (b) may acquire the searched-keywords from a predetermined keyword field included in metadata of the object files.

In this case, the step (b) may acquire the searched-keywords from metadata of the object files, which are prepared for acquisition of files and included in the file management information.

The present invention is also applicable as a program that causes one or multiple computers execute respective steps of the file search method described above. The program of the invention may be recorded in a computer readable recording medium (for example, a hard disk, a ROM, an FD, a CD, or a DVD), maybe transferred from one computer to another computer via a transfer medium (a communication network like the Internet or a LAN), or may be transmitted in any other suitable form. Only a single computer may execute the whole program or multiple computers may share execution of the program. Thus, the respective steps of the file search method described above are executed and same effects as those of the file search method are obtained.

BRIEF DESCRIPTION OF THE DRAWINGS

FIG. 9(a) is the screen in a state prior to registration of an unregistered keyword to an icon and FIG. 9(b) is the screen in a state after registration of the unregistered keyword to the icon;

DESCRIPTION OF THE PREFERRED EMBODIMENTS

Best modes for carrying out the present invention shall now be described with reference to the drawings.

Figure 1:
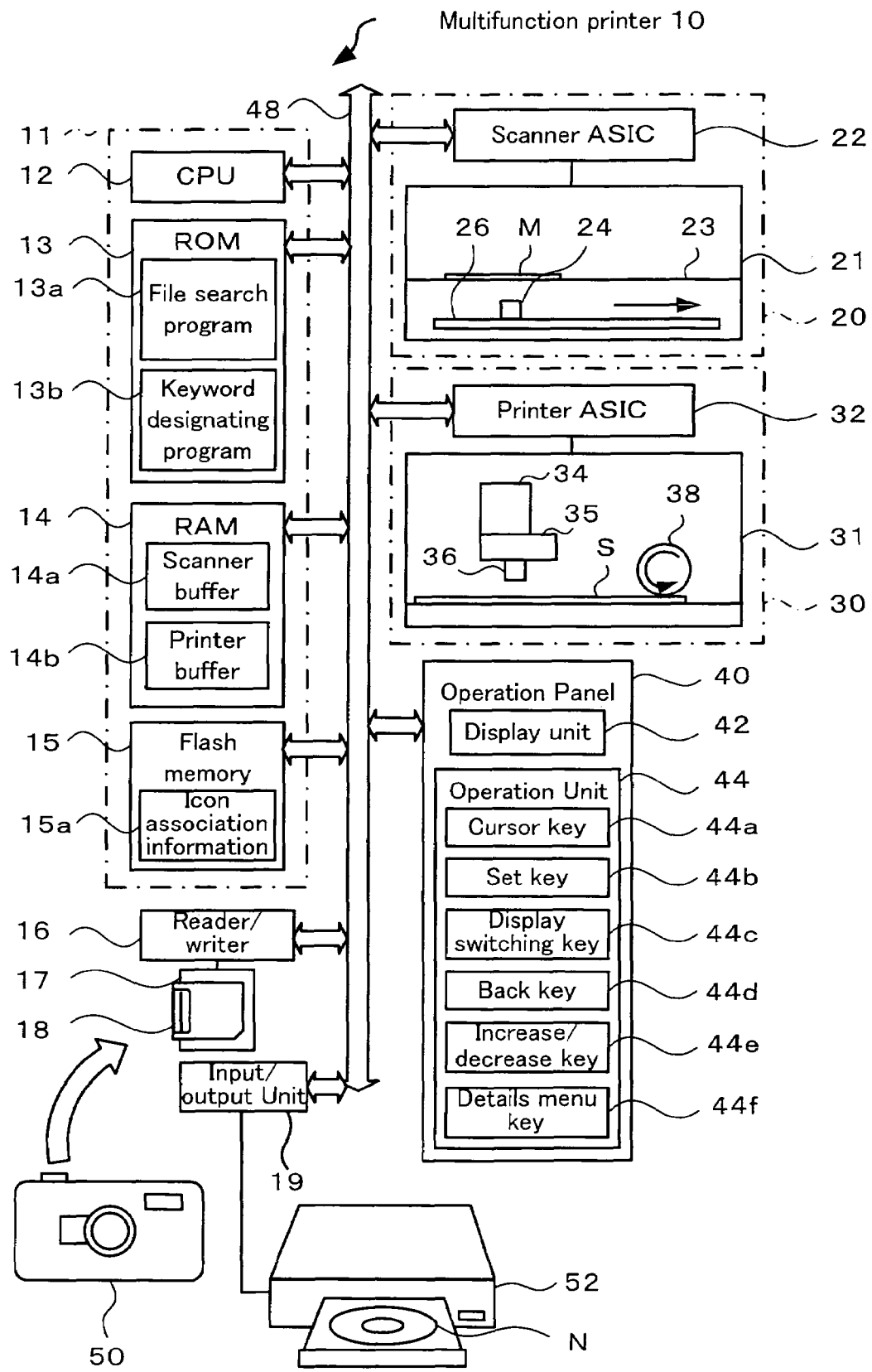
FIG. 1 is a block diagram of a multifunction printer 10 in one embodiment of the invention.
Figure 2:
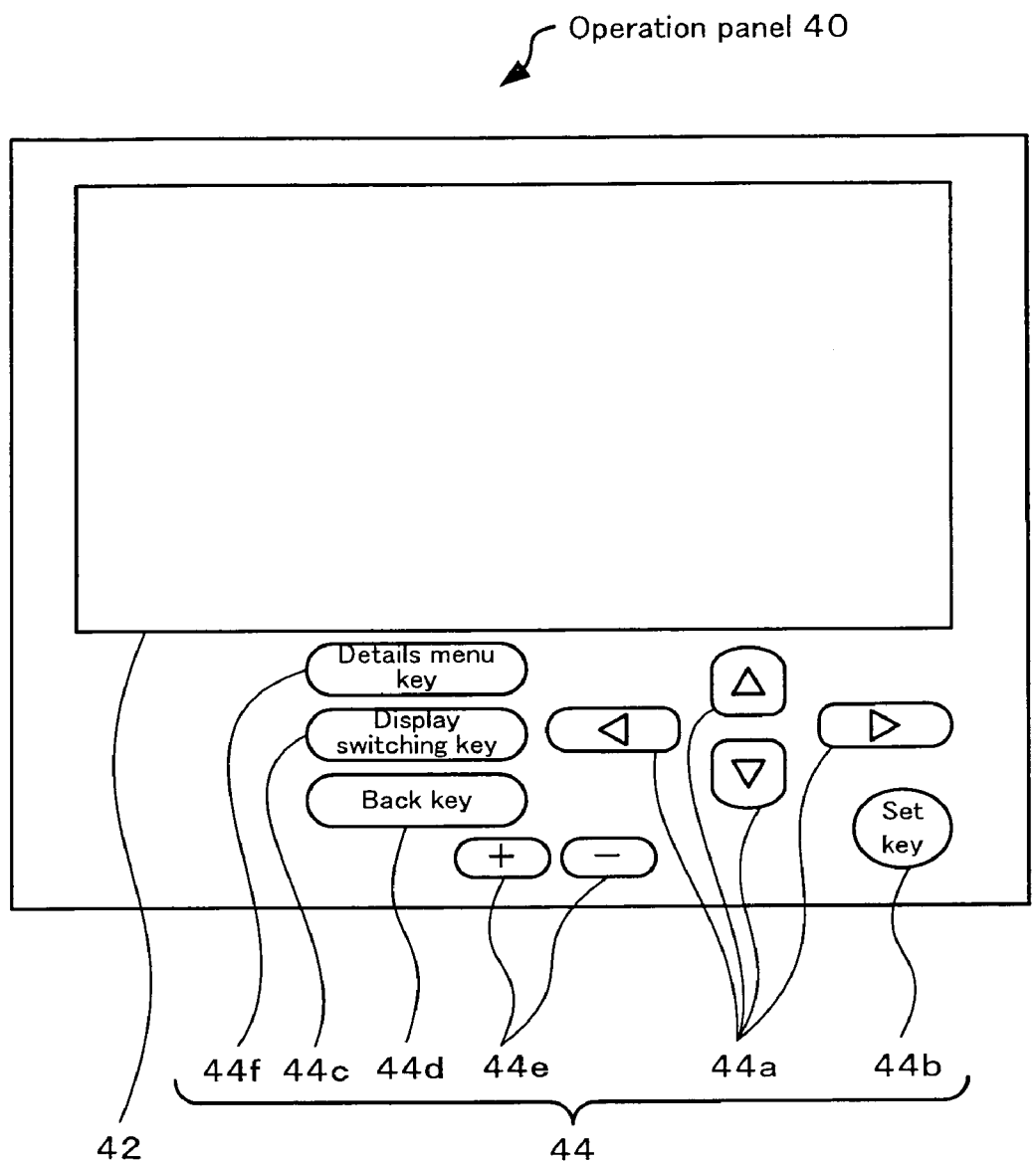
FIG. 2 is an explanatory diagram of an operation panel 40 of the embodiment.
Figure 3:
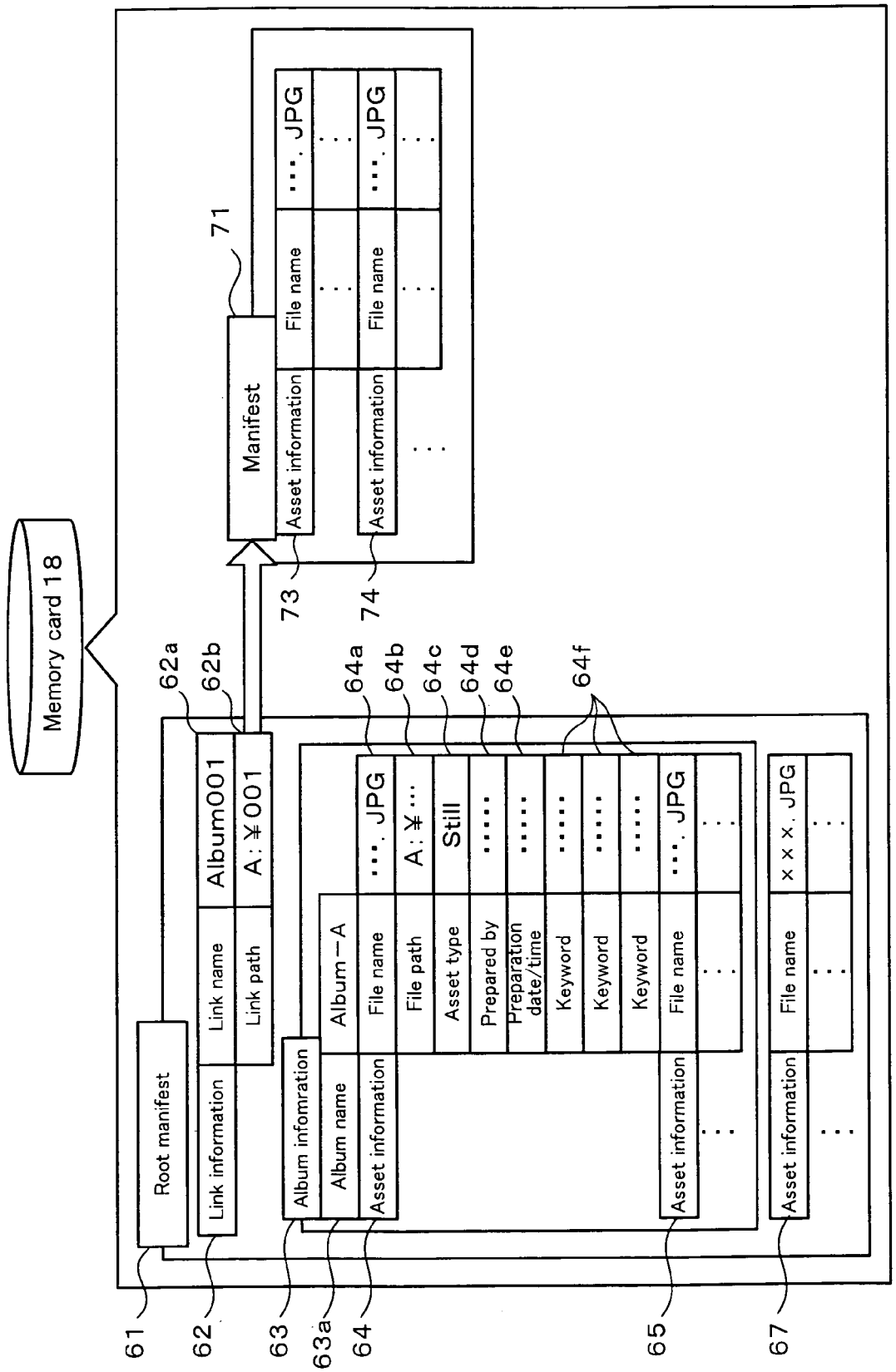
FIG. 3 is an explanatory diagram of a root manifest 61 and a manifest 71 of the embodiment.

FIG. 1 is a block diagram of a multifunction printer 10, which is one embodiment of the present invention, FIG. 2 is an explanatory diagram of an operation panel 40, and FIG. 3 is an explanatory diagram of a root manifest 61 and a manifest 71 that are stored in a memory card 18. As shown in FIG. 1, the multifunction printer 10 includes a reader/writer 16 that connects the memory card 18 inserted in a slot 17 in a readable/writable manner, an input/output unit 19 that is connectable to an external device, and a scanner unit 20 that includes a scanner mechanism 21 that executes a scanner function and a scanner ASIC 22 that controls the scanner mechanism 21. The multifunction printer 10 further includes a printer unit 30 that includes a printer mechanism 31 that executes a printer function and a printer ASIC 32 that controls the printer mechanism 31, an operation panel 40 by which a user inputs various instructions, and a controller 11 that controls the entire operations of the multifunction printer 10. "ASIC" is the abbreviation for "Application Specific Integrated Circuit."

The scanner unit 20 has the scanner mechanism 21 and the scanner ASIC 22. The scanner mechanism 21 is of a so-called flat-bed type and includes a glass surface 23 for placing a medium M from which an image is to be read, a line image sensor 24 that optically reads the medium M via the glass surface 23, and a moving unit 26 that scans the line image sensor 24 to read the medium M. The scanner ASIC 22 is an IC chip having the function of controlling the scanner mechanism 21 and stores scan data read by the line image sensor 24 of the scanner mechanism 21 into a scanner buffer 14a provided in a RAM 14 of the controller 11. The line image sensor 24 of the present embodiment is a known color image sensor that generates scan data by separating reflected light, resulting from emission of light onto the medium M, into the respective colors of red (R), green (G), and blue (B).

The printer unit 30 has the printer mechanism 31 and the printer ASIC 32. The printer mechanism 31 is constructed as an inkjet type full-color printer. The printer mechanism 31 includes an ink cartridge 34 that contains inks of the respective colors of cyan, magenta, yellow, light cyan, light magenta, and black individually, a pressure generating unit 35 that applies pressure to the respective inks supplied from the ink cartridge, a discharge port 36 that discharges the inks pressurized at the pressure generating unit 35 onto a recording paper S as a printing medium, and a conveying roller 38 that conveys the recording paper S. The pressure generating unit 35 employs a method of pressurizing ink by applying a voltage to a piezoelectric element and thereby deforming the piezoelectric element. The pressure generating unit 35 may instead employ a method of pressurizing ink by means of bubbles generated by applying voltage to a heating resistor (such as a heater) to heat the ink. The printer ASIC 32 is an IC chip having the function of controlling the printer mechanism 31 to develop print data in a printing buffer 14b, provided in the RAM 14, into a bitmap image one page at a time and to print the developed data onto the recording paper S.

The reader/writer 16 performs reading and writing of data from and into the memory card 18, which is inserted in slot 17 provided in a casing of the multifunction printer 10. An unillustrated sensor is provided in slot 17 to allow determination of whether or not the memory card 18 is installed. This sensor does not output a signal when the memory card 18 is not installed and outputs a signal when the memory card 18 is installed. The memory card 18 is a flash memory, which is an electrically-rewritable portable storage medium, and stores, for example, an image file taken by a digital camera 50. With this multifunction printer 10, image files taken by the user can be saved in the memory card 18 in an MPV (Music-Photo-Video) format. MPV is a standard that defines specifications of metadata for describing details of assets as contents. An asset is a unit of a target handled by MPV and may be made up of a single image file (such as a still image file) or a plurality of image files (such as a plurality of still image files taken continuously). The following description shall be made in terms of this asset. With MPV, a manifest, the contents of which are written in a markup language, XML, is used as a control file. In this manifest are described such metadata as information on storage locations of assets, preparation dates and times of assets, and searched-keywords associated with assets. Thus, by reading and analyzing the manifest, the multifunction printer 10 can specify what assets are stored in the memory card 18 without reading the respective assets themselves.

The concepts of manifests stored in the memory card 18 shall now be described with reference to FIG. 3. The root manifest 61 is the manifest that is read in first by the controller 11 when the memory card 18 is inserted. The root manifest 61 includes a link information 62 for linking to another manifest 71. The root manifest 61 also includes an album information 63 that enables specifying of an album, which is a collection of assets of a certain relationship, such as images taken at the same event (such as a field day) or images taken on the same date, an asset information 67, which enables specifying of an asset that exists independently without being included in an album, etc. The album information 63 includes an album name 63a and asset information 64, 65, . . . The asset information 64 includes a filename field 64a for specifying a file, a file path field 64b for specifying the storage location of the file, an asset type field 64c for distinguishing the type of image, an asset preparer field 64d, an asset preparation date/time field 64e, asset keyword fields 64f, etc. Asset types include still image (Still), image with audio (Still with Audio), multishot image (Still Multishot Sequence), panorama image (Still Panorama Sequence), and other assets (Other). The same type of contents as those of the asset information 64 are also included in the other asset information included in the root manifest 61.

The manifest 71 is the manifest of the link destination of the link information 62 registered in the root manifest 61. In the link information 62 are included a link name 62a for specifying a link and a link path 62b, which is information on the storage location of the manifest 71. The asset information 73, 74, . . . are included in the manifest 71. The root manifest 61 and the manifest 71 may further include other link information and other album information. Here, a manifest link refers to a link to another manifest, and link information refers to information, such as a link name, link path, etc., that enables a manifest link to be specified specifically.

The input/output unit 19 includes a terminal (such as a USB terminal) that is connectable to an external storage device 52 or other external device. The external storage device 52 is constructed as an optical disk drive capable of writing data and deleting written data, etc., on an optical disk N (such as a DVD-R, DVD-RW, DVD-RAM, CD-R, CD-RW, etc.) as a storage medium. The external storage device 52 is connected via a cable to the input/output unit 19, and stores data from the multifunction printer 10 into optical disk N or outputs data stored in the optical disk N to the multifunction printer 10 according to instructions from the controller 11. With the multifunction printer 10, an image file taken by a user can be stored in the MPV format in the optical disk N set in the external storage device. 52. The external storage device 52 may also be an external HDD, etc.

The operation panel 40 is a device by which a user inputs various instructions into the multifunction printer 10 and, as shown in FIG. 1 and FIG. 2, is provided with a display unit 42, on which characters, graphics, or symbols are displayed according to various instructions, and an operation unit 44 for performing various operations. The display unit 42 includes a liquid crystal panel that displays color images. On the operation unit 44 are positioned cursor keys 44a for moving a cursor to select a process, character, etc., a set key 44b for setting a process selection, etc., a display switching key 44c for switching a screen displayed on the display unit 42 to another screen, a back key 44d for returning a screen displayed on the display unit to an immediately previous screen, increase/decrease keys 44e for changing a character during character input, etc., a details menu key 44f for registering an unregistered searched-keyword, which is not associated with an icon, to an icon, etc.

Figure 4:
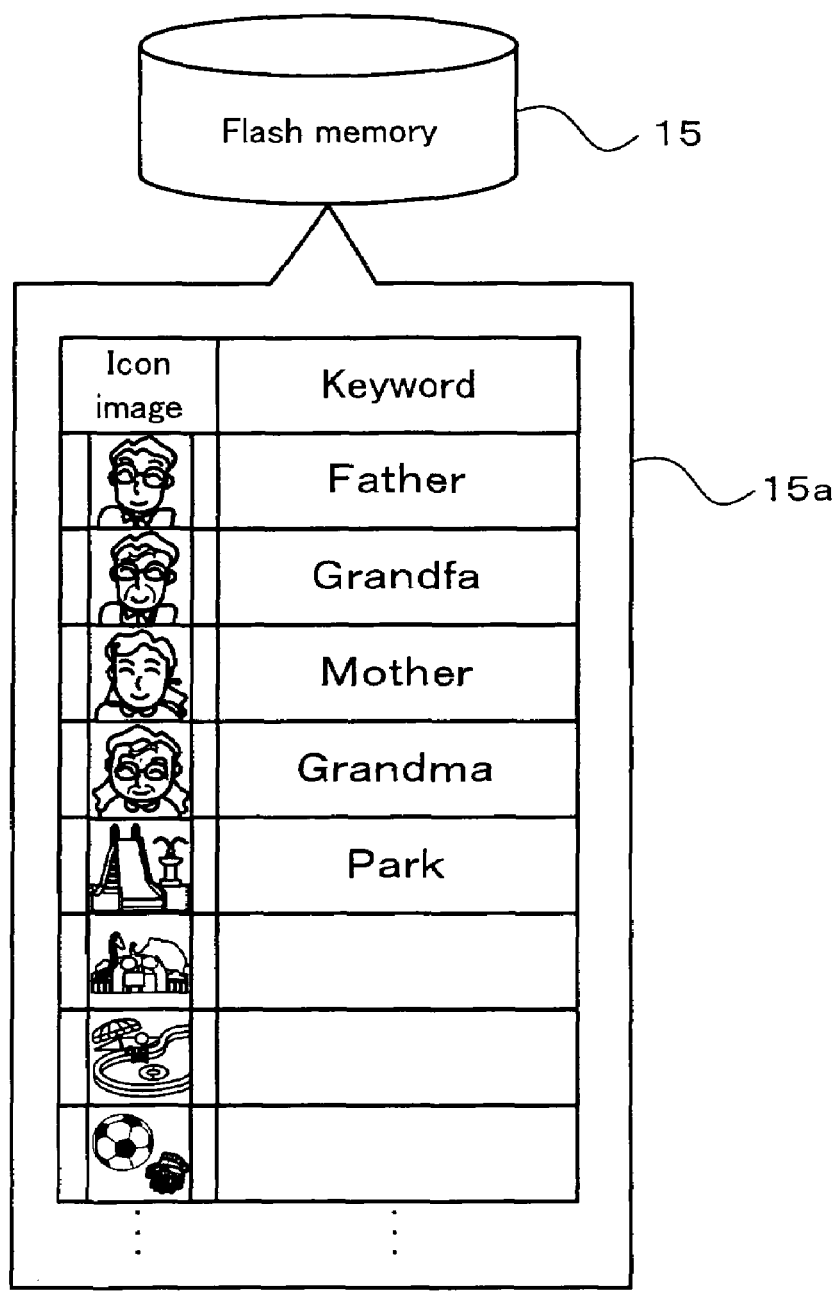
FIG. 4 is an explanatory diagram of a icon association information 15a of the embodiment.

The controller 11 is constructed as a microprocessor centered about the CPU 12 (see FIG. 1), and has a ROM 13 that stores various processing programs, a RAM 14 that temporarily stores data or saves data, and a flash memory 15 to and from which data can be written and deleted. The controller 11 is connected via a bus 48 to the reader/writer 16, the input/output unit 19, scanner ASIC 22, the printer ASIC 32, and the operation panel 40. The ROM 13 is a non-volatile storage device that stores a file search program 13a that is executed to search for an asset stored in the memory card 18, a keyword designating program 13b that is executed to designate searched-keywords to asset information, and various control programs as well as data on parts to be positioned on a screen, etc. The RAM 14 has a plurality of areas including the scanner buffer 14a, in which image information read by the scanner unit 20 is stored temporarily, and the printing buffer 14b, in which image information to be printed out by the printer unit 30 is stored temporarily. The flash memory 15 of the controller 11 stores the icon association information 15a, in which icon images prepared in advance are associated with searched-keywords designated by a user. FIG. 4 is an explanatory diagram of the icon association information 15a. Some of the icon images that have been prepared in advance are associated with respective searched-keywords by the user, while the others are not and have keyword field empty. Here, one searched-keyword can be associated with one icon image. The controller 11 uses the icon association information 15a to display searched-keywords as icons on the display unit 42.

Figure 5:
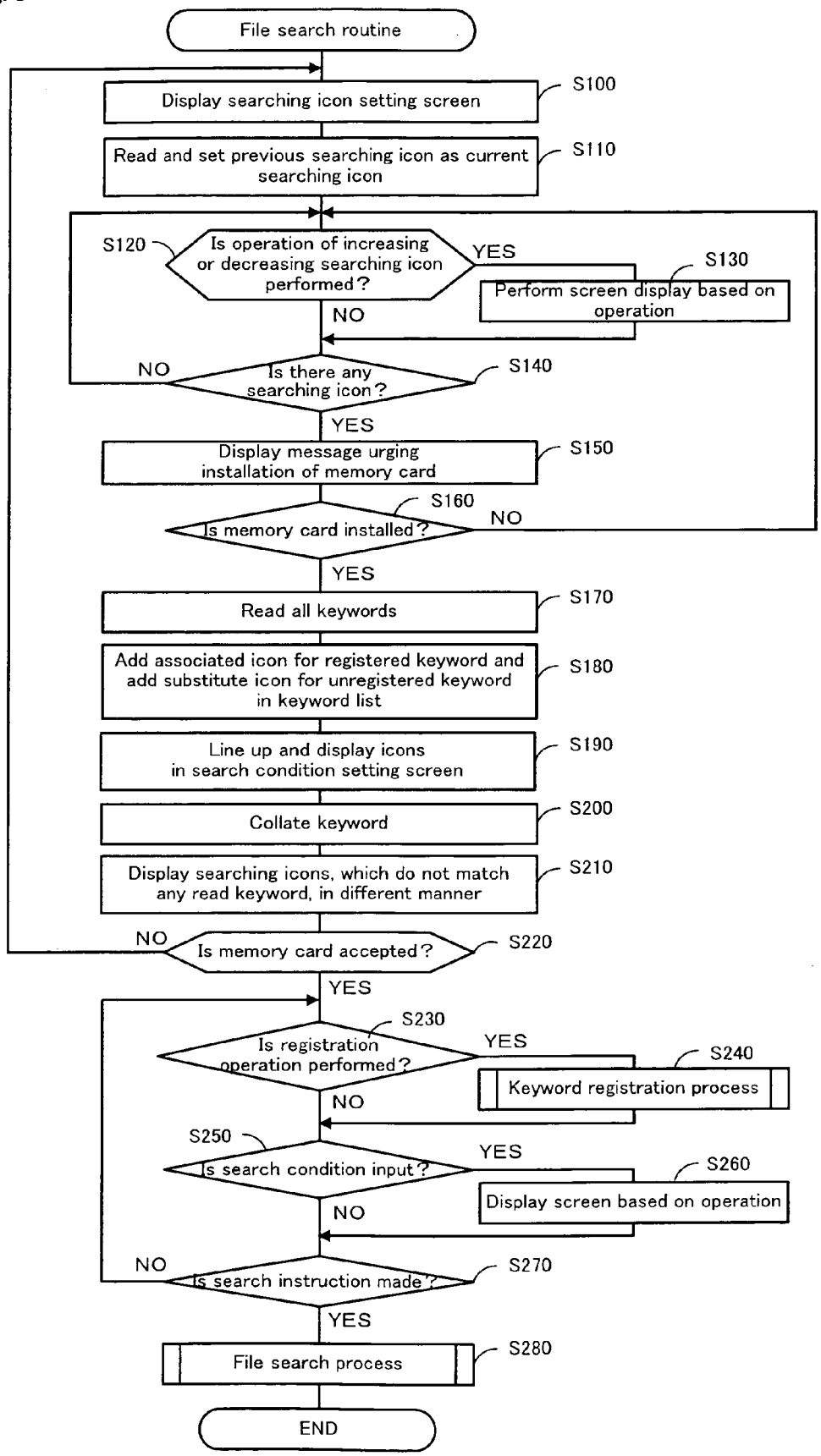
FIG. 5 is a flowchart showing a file search routine of the embodiment.

The following description regards operations of the multi-function printer 10 according to the present embodiment arranged in the above manner, in particular, an operation of searching assets stored in the memory card 18. FIG. 5 is a flowchart of a file search routine executed by the CPU 12 of the controller 11. This routine is stored in the ROM 13 and is executed by the CPU 12 when a user selects the execution of the asset search in an unillustrated menu screen. Here, a case where an image file stored in the MPV format in the memory card 18 is searched and searched-keywords are already associated with assets.

Figure 6:
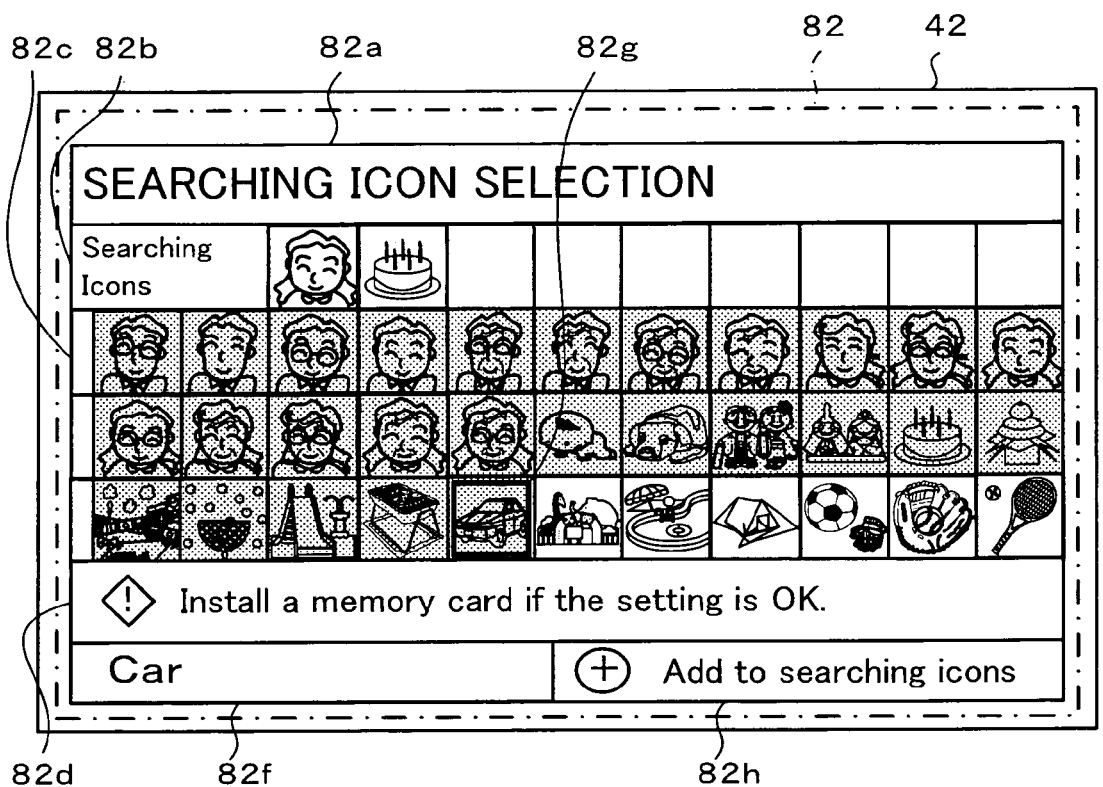
FIG. 6 is an explanatory diagram of a searching icon setting screen 82 of the embodiment.

When the routine of FIG. 5 starts, the CPU 12 displays a searching icon setting screen 82 on the display unit 42 (step S100). FIG. 6 is an explanatory diagram of the searching icon setting screen 82, which is an initial screen for setting conditions of the asset search. The search condition setting screen 82 includes a processing information display bar 82a for displaying the processing details, a searching icon display portion 82b for displaying icons used for searching, a keyword icon display portion 82c for displaying icons included in the icon association information 15a in a selectable manner, a message display portion 82d for displaying a message to the user, an associated keyword display portion 82f for displaying the searched-keyword that is associated with the icon being selected by the user in characters, an operation method display bar 82h for displaying an operation method, and a cursor 82g for selecting an icon, etc. Icons included in the icon association information 15a are aligned and positioned in the keyword icon display portion 82c. Here, an icon that is already associated with a searched-keyword and stored in the flash memory 15 is displayed in a different manner from that of an icon not associated with a searched-keyword. Specifically, the icons that are already associated with searched-keywords are displayed in graying out. In this searching icon setting screen 82, a user can select an icon (referred to hereinafter as "searching icon") as a searching-keyword positioned in the searching icon display portion 82b.

The CPU 12 then reads and sets previously-set searching icons as current searching icons (step S110). That is, searching icons that had been set previously according to instructions of the user are set as the current searching icons. Here, searching icons set in the searching icon display portion 82b are stored in the flash memory 15, and the stored searching icons are read out from the flash memory 15. The contents set in a refinement condition setting input portion 83b and a preparation date/time condition input portion 83e of a search condition setting screen 83 are also stored in the flash memory 15 and the CPU 12 reads the stored contents from the flash memory 15 and sets the current search conditions. When there is no searching icon that had been set previously, the CPU 12 jumps to the next step. The CPU 12 then judges whether or not a searching icon increasing/decreasing operation is performed (step S120). When a searching icon increasing/decreasing operation is performed, the CPU 12 performs screen display based on the searching icon increasing/decreasing operation (step S130). Specifically, in response to a searching icon increasing operation, an icon is added to the searching icon display portion 83c, and in response to a searching icon decreasing operation, an icon is deleted from the searching icon display portion 83c. When the cursor 82g is positioned at an icon in the keyword icon display portion 82c and a "+" key among the increase/decrease keys 44e is depressed in the searching icon setting screen 82, the icon is added as a searching icon to the searching icon display portion 82b. On the other hand, when the cursor 82g is positioned at a searching icon in the searching icon display portion 82b and a "−" key among the increase/decrease keys 44e is depressed, the searching icon is deleted from the searching icon display portion 82b. When the cursor 82g is positioned at an icon, the searched-keyword associated with the icon is displayed in characters in the associated keyword display portion 82f. When the display switching key 44c is depressed with the cursor 82g being positioned in the keyword icon display portion 82c, the screen switches to display and align other keyword icons. The contents displayed in the operation method display bar 82h are changed according to the operation method corresponding to the position of the cursor 82g when the cursor 82g is positioned, for example, in the searching icon display portion 82b or the keyword icon display portion 82c. Icons that are not associated with a searched-keyword cannot be selected as a searching icon.

After step S130 or when a searching icon increasing/decreasing operation is not performed in step S120, the CPU 12 judges whether or not there are searching icons, that is, whether or not any searching icons are set in the searching icon display portion 82b (step S140). When there is no searching icon, the CPU 12 repeats the processes of steps S120 to S140. When there is any searching icon, the CPU 12 displays a message urging the installation of the memory card 18 (step S150). The message displayed in the message display portion 82d (see FIG. 6) may be, for example, "Install a memory card if the settings are OK." The CPU 12 then judges whether or not the memory card 18 is installed (step S160). Whether or not the memory card 18 is installed is judged based on a signal of the sensor provided in the slot 17. While the memory card 18 is not installed, the CPU 12 repeats the processes of steps S120 to S160. That is, the CPU 12 waits for setting of a searching icon and installation of the memory card 18.

Figure 7:
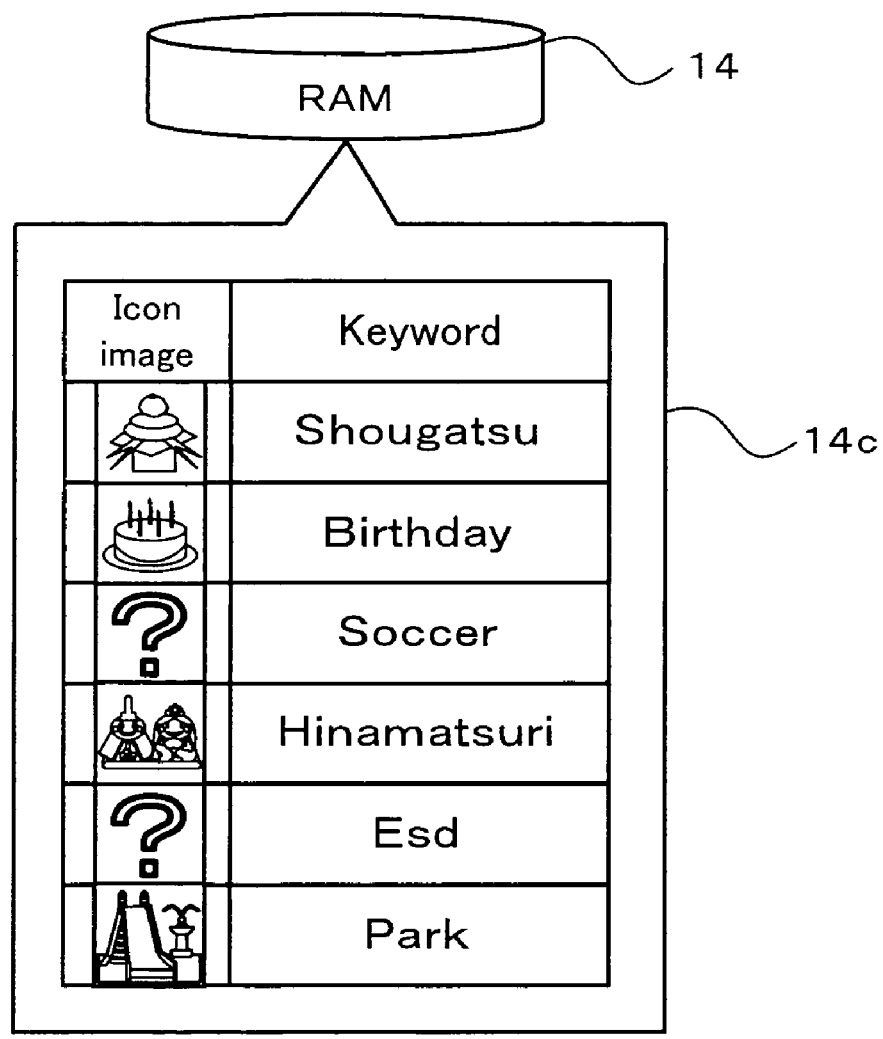
FIG. 7 is an explanatory diagram of a keyword list 14c of the embodiment.

On the other hand, when the memory card 18 is installed in step S160, the CPU 12 reads all searched-keywords contained in the memory card 18 (step S170). The searched-keywords contained in the memory card 18 are read from the keyword fields of the asset information that are included as metadata in the root manifest 61, the manifest 71, etc., stored in the memory card 18. Here, when a manifest link is registered in a manifest, the CPU 12 further reads searched-keywords on the asset information included in the manifest of the link destination. When a searched-keyword that is read is associated with an icon that has been prepared in advance, that is, when a searched-keyword is a registered keyword, the CPU 12 adds the keyword and the icon associated with the keyword to a keyword list 14c prepared in the RAM 14. When a searched-keyword that is read is not associated with an icon that has been prepared in advance, that is, when a searched-keyword is an unregistered keyword, on the other hand, the CPU 12 adds the keyword and a predetermined substitute icon to the keyword list 14c prepared in the RAM 14 (step S180). FIG. 7 is an explanatory diagram of the keyword list 14c in the RAM 14. Here a question mark is prepared as a substitute icon, and the same substitute icon is displayed for all unregistered keywords. Icons corresponding to all searched icons contained in the memory card 18 are thus read and listed in the keyword list 14c.

Figure 8:
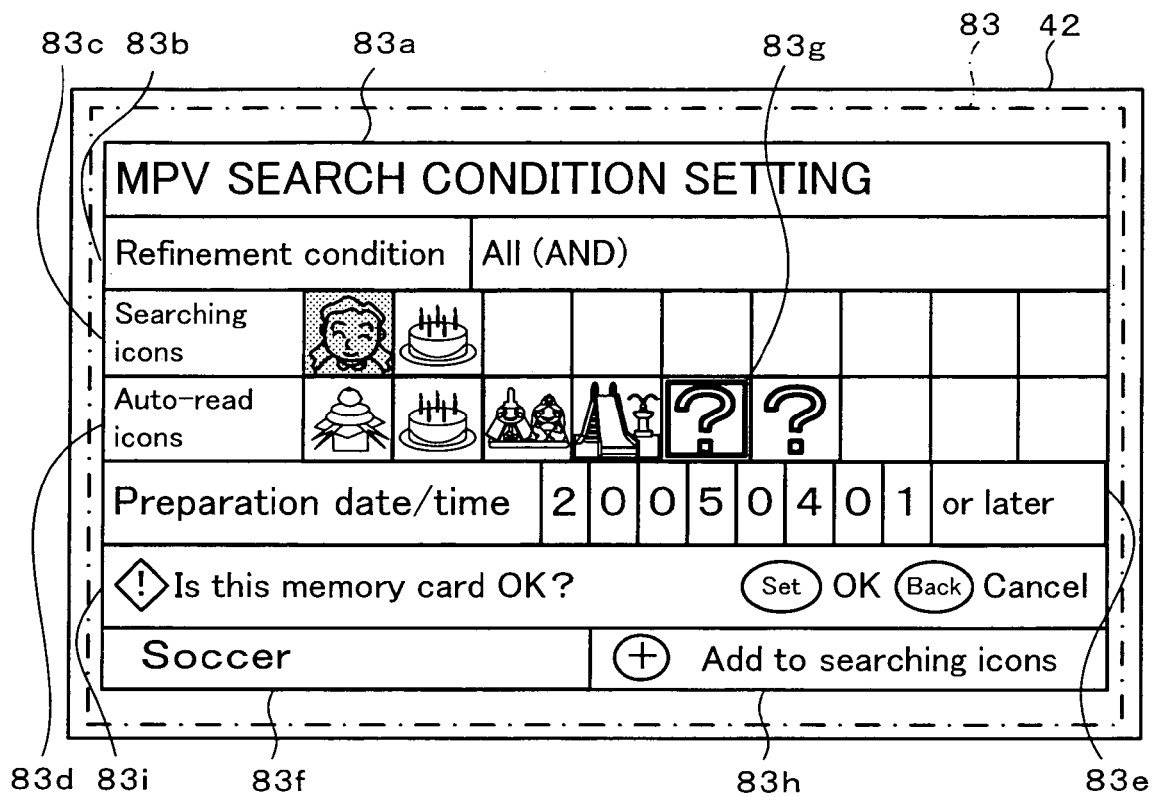
FIG. 8 is an explanatory diagram of a search condition setting screen 83 of the embodiment.

After step S180, the CPU 12 switches the display screen to the search condition setting screen 83 and lines up and displays the icons associated with the searched-keywords which have been read in the search condition setting screen 83 (step S190). FIG. 8 is an explanatory diagram of the MPV search condition setting screen 83. The search condition setting screen 83 includes a processing information display bar 83a for displaying the processing contents, a refinement condition setting input portion 83b for setting conditions for narrowing down assets, a searching icon display portion 83c for setting searching icons, an automatically-read icon display portion 83d for displaying the icons associated with all searched-keywords contained in the memory card 18 that have been read in step S170, a preparation date/time condition input portion 83e for setting the search conditions of preparation date and time, an associated keyword display portion 83f for displaying the searched-keyword that is associated with the icon being selected in characters, an operation method display bar 83h for displaying an operation method, and a message display portion 83i for displaying messages to the user. Here, the keyword list 14c is used to align and position icons associated with the read searched-keywords in the automatically-read icon display portion 83d. At this point, searching icons that were set in the searching icon display portion 82b of the searching icon setting screen 82 are displayed in the searching icon display portion 83c. In the search condition setting screen 83, icons are sorted so that the substitute icons are positioned last.

After lining up and displaying icons in the search condition setting screen 83 in step S190, the CPU 12 collates the searching-keywords associated with the searching icons, with the searched-keywords read from the memory card 18 (step S200). Specifically, whether or not there are any searched-keywords that match the set searching-keywords are checked by collation using the keyword list 14c (see FIG. 7) prepared in the RAM 14. Then, the CPU 12 displays the icons associated with the searching-keywords matching the searched-keywords read from the memory card 18 in a different manner from that of the icons that are associated with the searching-keywords that do not match any of the read searched-keywords (step S210). Here, the icons associated with the searching-keywords that do not match any of the read searched-keywords are displayed differently in graying out from the icons displayed in the automatically-read icon display portion 83d. Thus, if a grayed-out searching icon is displayed in the search condition setting screen 83, it can be recognized that the set searching-keyword is not contained in the currently installed memory card 18. On the other hand, when there is no icon displayed in graying out in the search condition setting screen 83, it can be recognized that all of the set searching-keywords are contained in the memory card 18.

After step S210, the CPU 12 displays, on the message display portion 83i, a message inquiring whether or not the currently installed memory card is to be accepted (see FIG. 8) and subsequently judges whether or not the currently installed memory card is accepted by the user (step S220). Whether or not the currently installed memory card is accepted is judged based on whether the set key 44b is depressed or the back key 44d is depressed. While the currently installed memory card is not accepted, the processes of steps S100 to S220 are repeated. That is, until the memory card is accepted in step S220, the CPU 12 repeats the processes of setting the previously set searching icons as the current searching icons, reading all searched-keywords from the installed the memory card 18 each time a memory card 18 is installed in slot 17, collating to judge the matching of the set searching-keywords with the searched-keywords read from the memory card 18, and displaying in graying out each searching icon for which the searching-keyword does not match any searched-keyword.

When the currently installed memory card is accepted by the user in step S220, on the other hand, the CPU 12 judges whether or not an operation of registering a keyword (unregistered keyword) that is not registered in the icon association information 15a is performed (step S230). Whether or not the registration operation is performed on an unregistered keyword is judged based on whether or not a substitute icon is designated by the positioning of a cursor 87g on the substitute icon and a details menu key 44f is depressed. When the registration operation is performed on an unregistered keyword, a keyword registration process is executed (step S240). The specific details of the keyword registration process shall be described later. After the keyword registration process has been executed in step S240, or when the registration operation of an unregistered keyword is not performed in step S230, the CPU 12 judges whether or not a search condition is input (step S250). When a search condition is input, the CPU 12 performs a screen display based on the input operation (step S260). Here, as the search condition input, the searching icons can be increased or decreased, a refinement condition can be set, or an asset preparation date/time condition can be set. In regard to increasing or decreasing the searching icons, when the cursor 83g is positioned at an icon in the automatically-read icon display portion 83d and the "+" key among the increase/decrease keys 44e is depressed, the icon is added as a searching icon to the searching icon display portion 83c, and when the cursor 83g is positioned at a searching icon in the searching icon display portion 83c and the "−" key among the increase/decrease keys 44e is depressed, the icon is deleted from among the searching icons. When the cursor 83g is positioned at an icon, the searched-keyword associated with the icon is displayed in characters in the associated keyword display portion 83f. By performing the above operations, a substitute icon may be set as a searching icon or deleted from among the searching icons. In regard to the refinement conditions, by positioning the cursor 83g in the refinement condition setting input portion 83b and depressing a left or right key 44a, "All (AND)," with which the search is performed using the searched-keywords in the AND condition, "Any (OR)," with which the search is performed using the searched-keywords in the OR condition, "None," with which the search using the searched-keywords is not performed, etc., can be set. In regard to the preparation date/time conditions, by positioning the cursor 83g in the preparation date/time condition input portion 83e and depressing an increase or decrease key 44e, "or later," with which assets prepared on or subsequent the designated date are searched, "only," with which assets prepared on the designated date are searched, "or before," with which assets prepared on or prior to the designated date are searched, "none," with which the search using the preparation date is not performed, etc., can be set. The numerical values of the preparation date/time as a search condition are input by the user depressing the left or right key to designate the position at which the numerical value is to be changed and then increasing the numerical value by depressing the "+" key among the increase/decrease keys 44e or decreasing the numerical value by depressing the "−" key among the increase/decrease keys 44e.

After step S260 or when a search condition is not input in step S250, the CPU 12 judges whether or not execution of the asset search is instructed(step S270). Whether or not the execution of the asset search is judged based on whether or not the set key 44b is depressed. Here, when no icon is positioned in the searching icon display portion 83c, the set key 44b can not be depressed. When the execution of the asset search is not instructed in step S270, the CPU 12 repeats the processes of steps S230 to S270.

On the other hand, when the execution of the asset search is instructed in step S270, the CPU 12 executes the asset search process of searching for assets that meet the search conditions input in the search condition setting screen 83 (step S280) and then ends the present routine. Specifically, assets that include the searched-keywords, which are associated with the searching icons displayed in the searching icon display portion 83c, and meet the conditions input in the refinement condition setting input portion 83b are searched for, and from among the assets found, assets that meet the conditions input into the preparation date/time input portion 83e are furthermore searched for. The asset search is executed by reading the contents of the preparation date/time fields and keyword fields included in the respective asset information of the root manifest 61 and the manifest 71 and judging whether or not the contents meet the search conditions. When assets meeting the search conditions are found, the CPU 12 reads the images of the assets, displays the read images on the display unit 42, and then ends the present routine. Here, thumbnails of the read images of the searched assets are aligned in the display unit 42. When assets meeting the search conditions are not found, a message indicating so is displayed in the message display portion 83i. Thereafter, when an image of an asset displayed in step S280 is selected and printing the image is instructed by the user, the CPU 12 executes printing. Specifically, upon receiving the print instruction from the user, the CPU 12 outputs a print command to the printer ASIC 32. In response to the print command, the printer ASIC 32 performs bitmap expansion of the printing data stored in the printing buffer 14a of the RAM 14, drives an unillustrated drive motor to rotate the conveying roller 38 to convey the recording paper S, and controls the voltage applied to the pressure generating portion 35 to print the image on the recording paper S based on the image data that has been expanded into a bitmap.

Figure 9:
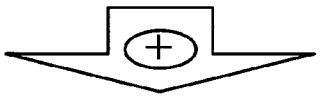
FIG. 9 is an explanatory diagrams of the keyword registration screen 87 of the embodiment, where

The keyword registration process of step S240 shall now be described. When cursor 87g is positioned on a substitute icon and the details menu key 44f is depressed, the CPU 12 displays a keyword registration screen 87 on the display unit 42. FIG. 9 shows explanatory diagrams of the keyword registration screen 87, where FIG. 9(a) is the screen in a state prior to registration of an unregistered keyword to an icon and FIG. 9(b) is the screen in a state after registration of the unregistered keyword to the icon. The keyword registration screen 87 includes a processing information display bar 87a for displaying the processing details, an unregistered keyword display portion 87b for displaying the unregistered keyword associated with the selected substitute icon in characters, a keyword icon display portion 87c for displaying icon images that have been prepared in advance, an operation method display bar 87e for displaying an operation method, an associated keyword display portion 87d for displaying the searched-keyword that is associated with the icon being selected in characters, and a cursor 87g for selecting an icon, etc. The operations of the method of input into the unregistered keyword display portion 87b are the same as those of the method of input into a keyword input portion 81c of a keyword designating screen 81. Also, as with a keyword icon display portion 81d, icons that are already allocated to searched-keywords are displayed in a graying out in the keyword icon display portion 87c. When cursor 87g is positioned at an icon displayed in the keyword icon display portion 87c as shown in FIG. 9(a), and the "+" key among the increase/decrease keys 44e is depressed by the user, the searched-keyword displayed in the unregistered keyword display portion 87b, that is, the user-designated searched-keyword that is associated with the substitute icon becomes associated with the icon at which cursor 87g is positioned and registered in the icon association information 15a. The CPU 12 then performs sorting and repositioning of the icons so that the icons that are not associated with keywords come last and the searched-keyword is displayed in characters in the associated keyword display portion 87d as shown in FIG. 9(b). When an icon, with which a keyword has already been registered, is designated by the user, the searched-keyword that was registered previously is deleted and the new searched-keyword is registered.

The correspondence between the components of the present embodiment and the components of the present invention shall now be explained. The display unit 42 of the embodiment corresponds to the display unit of the present invention, the controller 11 corresponds to the acquisition module, the setting module, the collation module, and the display control module of the invention, the flash memory 15 corresponds to the information storage module of the invention, the reader/writer 16 corresponds to the installation module of the invention, and the printer unit 30 corresponds to the printing unit of the invention. The root manifest 61 and the manifest 71 correspond to the file management information. With the description of the operations of the multifunction printer 10 in the present embodiment according to the invention, operations of a file research method is also explained.

In the multifunction printer 10 according to the embodiment described above, when searching-keywords are set according to instructions of a user and a memory card 18 is installed in the reader/writer 16, searched-keywords associated with assets as the search objects are acquired from the installed the memory card 18, the set searching-keywords and the acquired searched-keywords are collated, and the display unit 42 is controlled to allow for recognition of the collation results. Thus, before a user executes an actual file search, whether or not there are any searching-keywords, among the searching-keywords that had been set, that match the searched-keywords acquired from the memory card 18 can be recognized. The user can thus know whether or not the memory card 18 is the one that the user intended without performing troublesome operations.

In the multifunction printer 10 according to the embodiment described above, the display unit 42 is controlled so that the searching icons are displayed in a manner that allows for recognition of the collation results, and the collation results are displayed using the searching-keywords. Therefore, it can be readily recognized which searching-keywords are matched. Also, since the searching-keywords are displayed as icons, the searching-keywords can be readily recognized visually. Furthermore, in the multifunction printer 10 described above, among the searching-keywords that had been set in advance, the keywords that are matched to the acquired searched-keywords are displayed in a different manner from that of the searching-keywords that are not matched to the acquired searched-keywords. This arrangement allows for easy distinction. In particular, since the searching-keywords that are not matched to the acquired searched-keywords are displayed in graying out, the user can easily recognize that the searched-keywords that are associated with intended assets are not contained in the currently installed memory card 18, that is, the currently installed memory card 18 is not the one that is intended by the user. Furthermore, in the multifunction printer 10, the collation results as to whether the previously set searching-keywords are included in the currently installed the memory card 18 are displayed each time a memory card is installed. The user can find the memory card 18 containing the targeted assets without taking further trouble.

In the multifunction printer 10 described above, the display unit 42 is controlled to display the icons associated with the searched-keywords acquired from the memory card 18, along with the icons associated with the set searching-keywords. The user can thus check the searched-keywords contained in the memory card 18 and can find the intended memory card 18 readily. In the multifunction printer 10, since the searched-keywords are displayed as icons, the searched-keywords can be readily recognized visually. Furthermore, since the characters of the searched-keyword associated with the currently selected icon are displayed along with the icon on the display unit 42, the keyword associated with the icon can be confirmed by the characters. Furthermore, since the searched-keywords are acquired from the keyword fields of the metadata of the search object assets of the manifests that include the metadata and are prepared so that the assets can be acquired using the included metadata, the searched-keywords can be acquired reliably and the searched-keywords can be acquired readily in comparison to acquiring the searched-keywords by reading the respective files. There are many cases where printing is executed upon searching for an intended file from among a plurality of files recorded in a portable storage medium (memory card, CD-R, etc.) and there is thus a high demand to search files. The present invention is effectively applied to such cases.

In the multifunction printer 10, when a searched-keyword read from the memory card 18 is an unregistered keyword, with which an icon that is priorly stored in the flash memory 15 is not associated, a predetermined substitute icon is displayed as the icon associated with the unregistered keyword. The searched-keywords that are not stored in association with icons can thus also be displayed as icons. The registration of an unregistered searched-keyword associated with a substitute icon by association with an icon selected by a user's own choice does not require the trouble of inputting the keyword. Furthermore, in the multifunction printer 10, when the user registers an unregistered keyword in the flash memory 15, the unregistered keyword and the icon to be associated with the unregistered keyword are displayed in a single screen. Which icon is to be associated with the unregistered keyword can be checked readily.

The present invention is by no means restricted to the above-described embodiment and can obviously be put into practice in various modes within the scope of the art of the invention.

Figure 10:
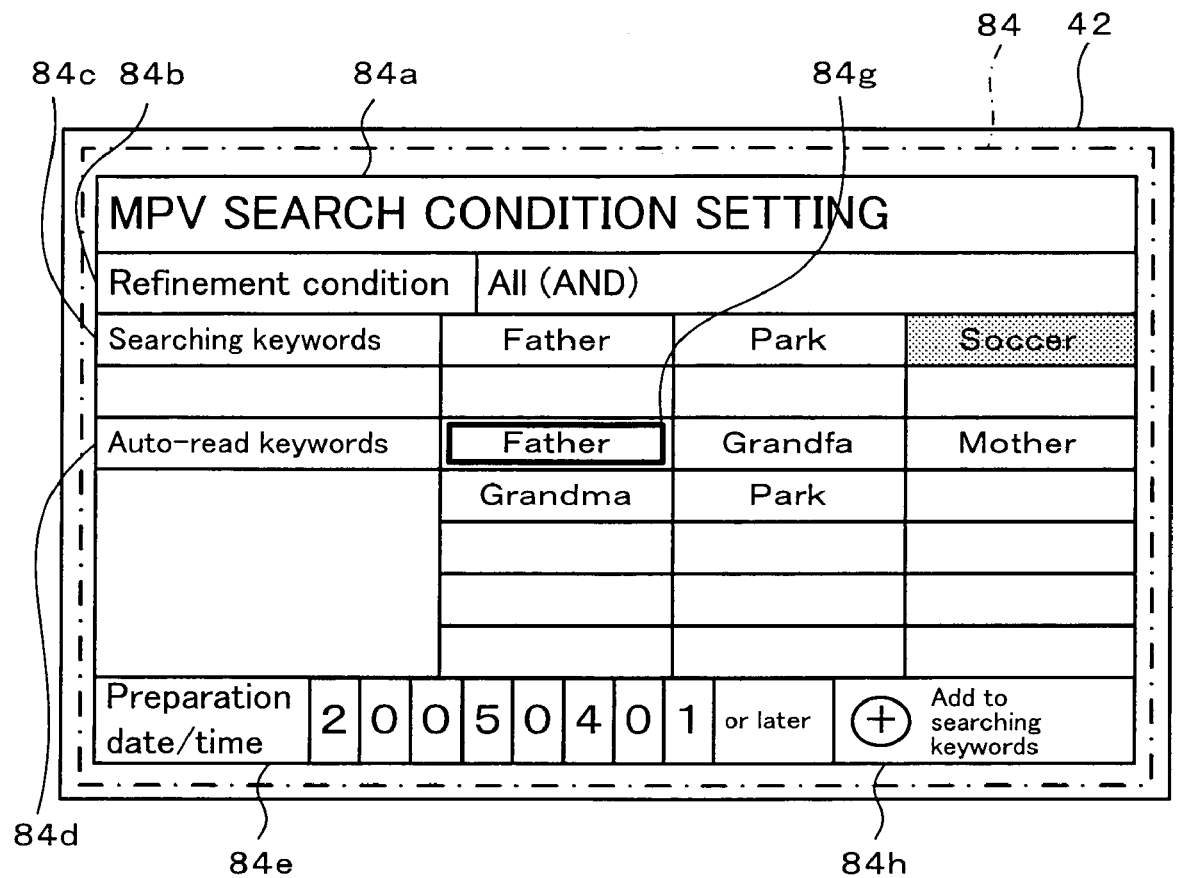
FIG. 10 is an explanatory diagram of a search condition setting screen 84 in another embodiment.

In the above-described embodiment, the searched-keywords read from the memory card 18 and the searching-keywords that are the asset search conditions are displayed as icons on the display unit 42. The searched-keywords and searching-keywords may instead be displayed in characters as shown in FIG. 10. FIG. 10 is an explanatory diagram of a search condition setting screen 84. In this search condition setting screen 84, the keywords are displayed in characters in the searching-keyword display portion 84c, in which a searching-keyword can be input as a search condition, and the automatically-read keyword display portion 84d, into which all keywords contained in the memory card 18 are read and displayed. When a cursor 84g is positioned at a searched-keyword displayed in the automatically-read keyword display portion 84d and the "+" key among the increase/decrease keys 44e is depressed, the keyword is input into the searching-keyword display portion 84c. A user can thus know whether a memory card 18 is that intended by him/herself without performing troublesome operations with this arrangement as well.

Figure 11:
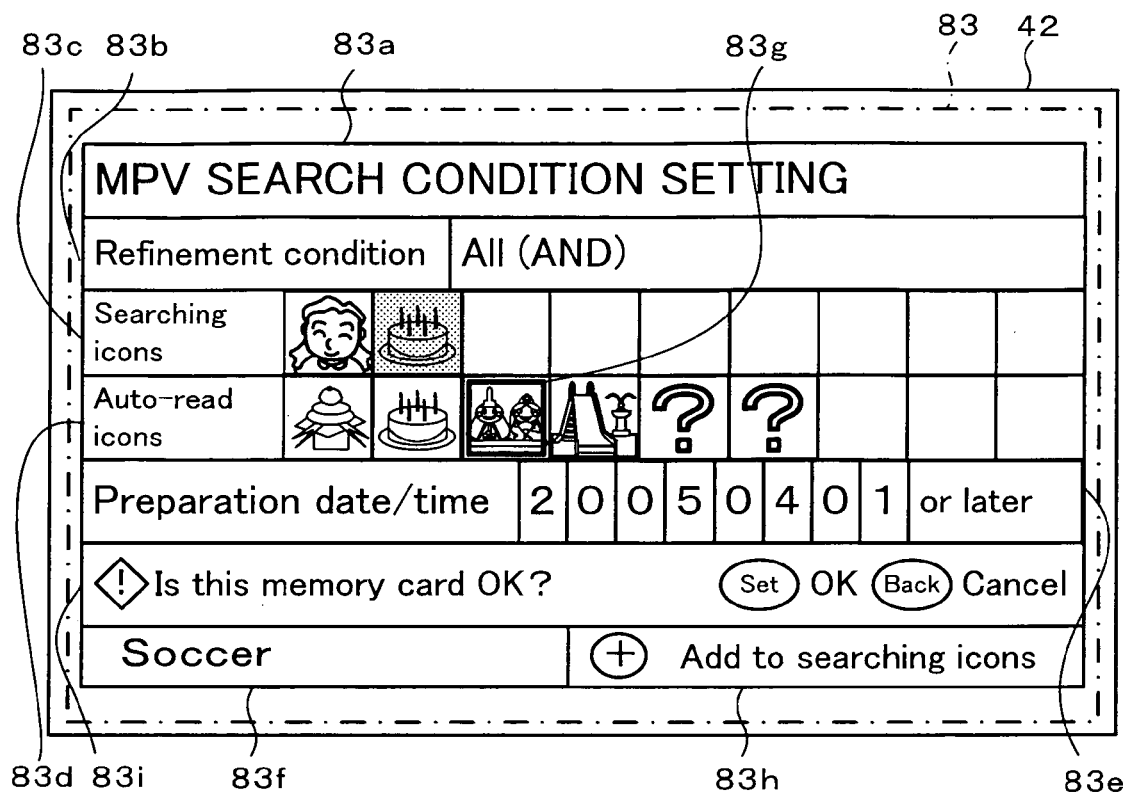
FIG. 11 is an explanatory diagram of a search condition setting screen 83 in another embodiment.
Figure 12:
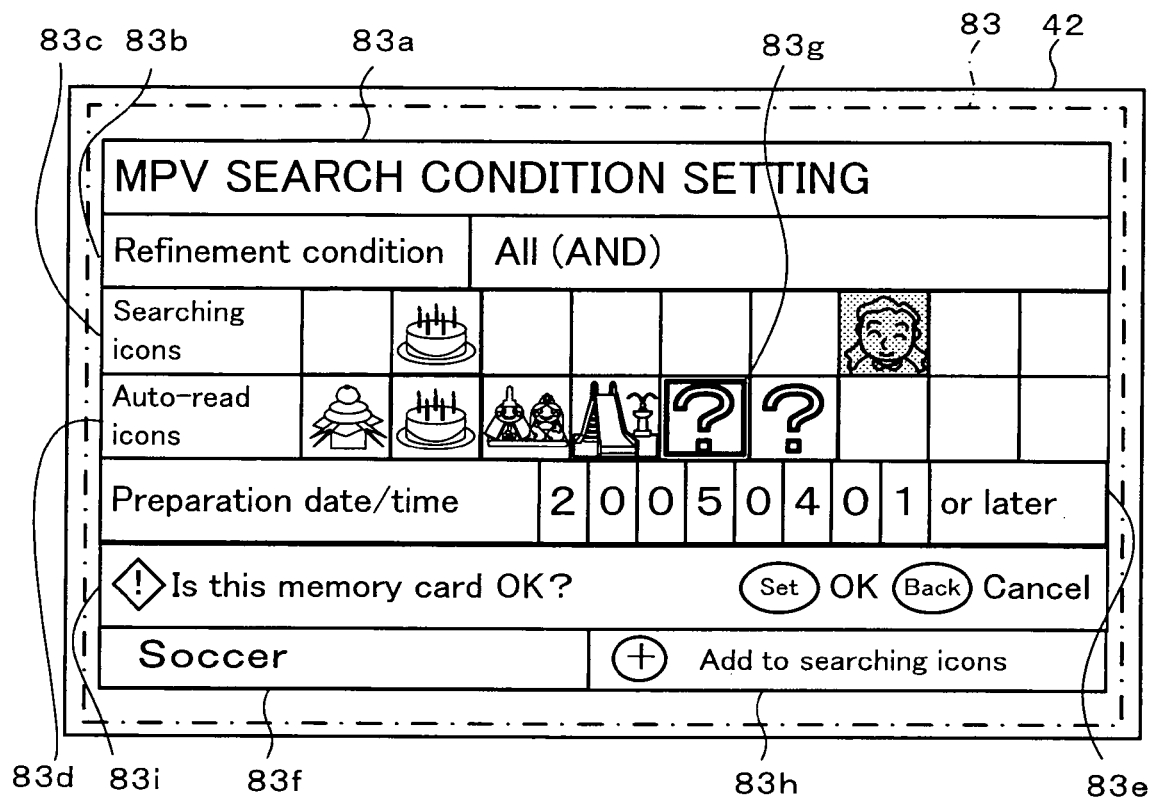
FIG. 12 is an explanatory diagram of a search condition setting screen 83 in another embodiment.

In the above-described embodiment, the icons associated with the searching-keywords that do not match any searched-keywords read from the memory card 18, are displayed in graying out (step S230). The icons associated with the searching-keywords that match searched-keywords read from the memory card 18 may instead be displayed in a grayed-out manner as shown in FIG. 11. By doing so, when there is an icon displayed in the searching icon display portion 83c that is displayed in the normal manner, it can be recognized that a searched-keyword associated with an intended asset is not contained in the currently installed the memory card 18. Also, icons respectively associated with searched-keywords and searching-keywords may be positioned in the searching icon display portion 83c and the automatically-read icon display portion 83d in a manner such that the searched-keywords read from the memory card 18 and the matched searching-keywords are aligned as shown in FIG. 12. Because matching icons will then be aligned close together, the keyword matching state can be recognized readily. In this case, the icons associated with the searching-keywords that are not matched with the searched-keywords read from the memory card 18 may be positioned at positions away from the icons associated with the searched-keywords read from the memory card 18 as shown in FIG. 12. The unmatched searching icons can then be recognized readily.

Figure 13:
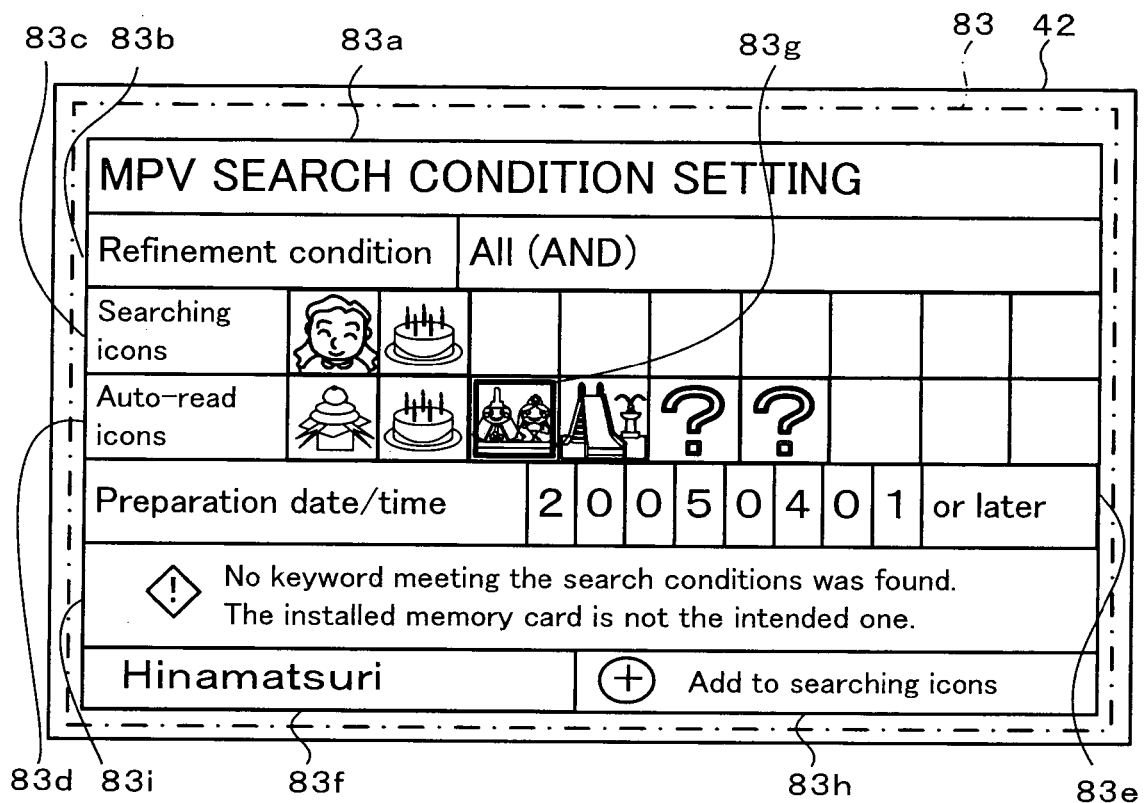
FIG. 13 is an explanatory diagram of a search condition setting screen 83 in still another embodiment.

In the above-described embodiment, in performing display to allow for recognition of the results of collating the set searching-keywords and the acquired searched-keywords, icons were displayed in graying out (stepS230). The results of collation may instead be displayed as a message as shown in FIG. 13. The user can know whether or not the memory card 18 is the one intended by the user without performing troublesome operations in this case as well.

In the above-described embodiment, the searched-keywords are read from the keyword field of the asset information that is the metadata of each asset (step S170). The searched-keywords in album information may be registered and the searched-keywords may be read from the keyword field of the album information. In this case, it may be deemed that all assets included in the album are associated with the searched-keywords registered in the album information. By doing so, the searched-keywords can be read in one step from the album information of an album compiled for a specific event (such as a field day) or a specific person (such as a father) and the process of reading keywords individually from each asset information can be reduced.

In the above-described embodiment, the same substitute icon is displayed for all of a plurality of unregistered keywords in display portion 42 (see FIG. 8). Different substitute icons may be displayed (for example, by attaching different numbers, coloring in different colors, etc.) instead for respective unregistered keyword in display portion 42. A plurality of substitute icons that are associated with mutually different unregistered keywords can thereby be distinguished readily.

In the above-described embodiment, all of the searched-keywords contained in the memory card 18 are read. The searched-keywords may instead be read from within a search range designated by a user. For example, arrangements may be made so that in the search condition setting screen 83, searched-keywords among the searched-keywords contained in the memory card 18, that are within a range input in the preparation date/time condition input portion 83e are read.

The search condition setting screen 83 may also be arranged to allow for designation of folders, albums, file formats, etc., so that a user designates these and keywords are read from the designated range. The user can know whether or not the memory card 18 is that intended by the user without performing troublesome operations in this case as well.

In the above-described embodiment, the searching icon setting screen 82 is displayed in step S100 and searching icons are set from among the icons displayed in the keyword icon display portion 82*c*. The search condition setting screen 83 may be displayed in place of the searching icon setting screen 82 in step S100 and arrangements may be made so that for just the search operation of the first time, the memory card 18 is inserted first and searching icons are set from among icons positioned in the automatically-read icon display portion 83*d*. A user can know whether or not the memory card 18 is that intended by him/herself without performing troublesome operations in this case as well.

Furthermore, although with the above-described embodiment, a case of searching assets stored in the MPV format in the memory card 18 was described, the present invention may be used to search assets stored in the MPV format in optical disk N (CD-R, etc.) set in the external storage device 52 or to search assets stored in the MPV format in an HDD connected to the input/output unit 19.

The above-described embodiment regards searching still image files stored in the MPV format. The invention may also be applied to a search of other MPV files (such as moving image files, music files, etc.). Also, the present invention is not restricted in particular to files stored in the MPV format and may, for example, be applied to a search of image files stored according to the DCF (Design rule for Camera File system) method or applied to a search of other files (for example, document files, etc.). In such a case, searched-keywords may be stored in keyword fields that are set up in advance in the files to be searched and read from the keyword fields.

In the above-described embodiment, a full-color printer mechanism 31 that employs the inkjet method is used. An electrophotographic color laser printer, a thermal transfer color printer, or a dot-impact type printer or a monochromatic printer of any of the above types may be used instead. Although the multifunction printer 10 has a scanner unit 20 installed therein, it may be arranged instead as a composite printer combining a fax machine, copier, etc., or as a printer from which scanner 20 is omitted. The present invention may also be applied to an image processor of a personal computer, digital camera, digital video camera, etc. Also, although with the above-described embodiment, a search of images taken by digital camera 50 was described, the present invention may also be applied to a search of images scanned by the scanner unit 20.

The present application claims the benefit of priority from Japanese Patent Application No. 2005-152404 filed on May 25, 2005, the entire contents of which are incorporated by reference herein.

What is claimed is:

1. A file search apparatus tat searches for a file based on one or more searched-keywords associated with object files and one or more searching-keywords selected by a user, the file search apparatus comprising:
    a display unit that displays an image;
    an installation module to which a storage medium storing object files is installed;
    a setting module that sets the searching-keywords according to an instruction by the user;
    an acquisition module that, when the searching-keywords are set by the setting module and the storage medium is installed to the installation module; acquires the searched-keywords associated with object files from the storage medium;
    a collation module that performs collation as to whether each of the searching-keywords set by the setting module matches any of the searched-keywords acquired by the acquisition module;
    a display control module that controls the display unit to display in a manner that results of the collation by the collation module is recognizable;
    an information storage module that stores icons in association with the respective searched-keywords; wherein
    the display control module reads an icon associated with a searched-keyword corresponding to each of the searching-keywords that are selected from the searched-keywords, from the information storage module, and displays the read icons as the searching-keywords.

2. The file search apparatus according to claim 1, wherein the display control module controls the display unit to display the searching-keywords in a manner that the results of collation by the collation module is recognizable.

3. The file search apparatus according to claim 2, wherein the display control module controls the display unit to display a matched searching-keyword, among the searching-keywords, which match one of the searched-keywords and a non-matched searching-keyword
    which does not match any of the searched-keywords in different manners, so that the results of collation by the collation module is recognizable.

4. The file search apparatus according to claim 1, wherein
    the setting module sets the searching-keywords that has been set previously as current searching-keywords,
    each time a storage medium is installed to the installation module after the setting module sets the searching-keywords, the acquisition module acquires searched-keywords associated with respective object files from the newly installed storage medium, and
    each time the searched-keywords associated with the object files are acquired from the storage medium by the acquisition module, the collation module performs collation as to whether each of the searching-keywords set by the setting module matches any of the searched-keywords acquired by the acquisition module.

5. The file search apparatus according to claim 1, wherein the display control module reads icons associated with the searching-keywords set by the setting module and the icons associated with the searched-keywords acquired by the acquisition module from the information storage module and displays the read icons.

6. The file search apparatus according to claim 5, wherein the display control module controls the display unit to display characters of the searched-keywords associated with the currently selected icons, along with the icons.

7. The file search apparatus according to claim 1, wherein the acquisition module acquires the searched-keywords from a predetermined keyword field included in initiate of the object files.

8. The file search apparatus according to claim 7, wherein the acquisition module acquires the searched-keywords from metadata of the object files, which are prepared for acquisition of files and included in the file management information.

9. A printer, comprising:
   the file search apparatus according to claim 1, and
   a printing unit that prints, using colorants, contents included in a file searched by the file search apparatus, onto a printing medium.

10. A file search method that searches for a file, by using a file search apparatus having a display unit that displays an image and an installation module to which a storage medium storing object files, based on one or more searched-keywords associated with object files and one or more searching-keywords selected by a user, the file search method comprising the steps of:
   (a) setting the searching-keywords according to an instruction by the user;
   (b) when the searching-keywords are set by the setting module and the storage medium is installed to the installation module, acquiring the searched-keywords associated with respective object files from the storage medium;
   (c) performing collation as to whether each of the searching-keywords set by the step (a) matches any of the searched-keywords acquired by the step (b); and
   (d) controlling the display unit to display in a manner that results of the collation by the step (c) is recognizable, wherein the file search apparatus has an information storage module that stores icons in association with the respective searched-keywords; wherein
   the step (d) reads an icon associated with a searched-keyword corresponding to each of the searching-keywords that are selected from the searched-keywords, from the information storage module, and displays the read icons as the searching-keywords.

11. The file search method according to claim 10, wherein the step (d) controls the display unit to display the searching-keywords in a manner that the results of collation by the step (c) is recognizable.

12. The file search method according to claim 11, wherein the step (d) controls the display unit to display a matched searching-keyword, among the searching-keywords, which match one of the searched-keywords and a non-matched searching-keyword which does not match any of the searched-keywords in different manners, so that the results of collation byte step (c) is recognizable.

13. The file search method according to claim 10, wherein
   the step (a) sets the searching-keywords that has been set previously as current searching-keywords,
   each time a storage medium is installed to the installation module after the step (a) sets the searching-keywords, the step (b) acquires searched-keywords associated with respective object files from the newly installed storage medium, and
   each time the searched-keywords associated with the object flies are acquired from the storage medium by the step (b), the step (c) performs collation as to whether each of the searching-keywords set by the step (a) matches way of the searched-keywords acquired by the step (b).

14. The file search method according to claim 10, wherein
   the step (d) reads icons associated with the searching-keywords set by the step (a) and the icons associated with the searched-keywords acquired by the step (b) from the information storage module and displays the read icons.

15. The file search method according to claim 14, wherein the step (d) controls the display unit to display characters of the searched-keywords associated with the contently selected icons, along with the icons.

16. The file search method according to claim 10, wherein the step (b) acquires the searched-keywords from a predetermined keyword field included in metadata of the object files.

17. The file search method according to claim 16, wherein the step (b) acquires the searched-keywords from metadata of the object files, which are prepared for acquisition of files and included in the file management information.

* * * * *

UNITED STATES PATENT AND TRADEMARK OFFICE
CERTIFICATE OF CORRECTION

| | | |
|---|---|---|
| PATENT NO. | : 7,620,629 B2 | Page 1 of 1 |
| APPLICATION NO. | : 11/440739 | |
| DATED | : November 17, 2009 | |
| INVENTOR(S) | : Yoshiyuki Tanaka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Twenty-sixth Day of October, 2010

David J. Kappos
*Director of the United States Patent and Trademark Office*